Aug. 30, 1955 E. E. LINDSEY 2,716,377
MEANS FOR THE MANUFACTURE OF ARTICLES OF FOOD
Filed May 26, 1950 5 Sheets-Sheet 1
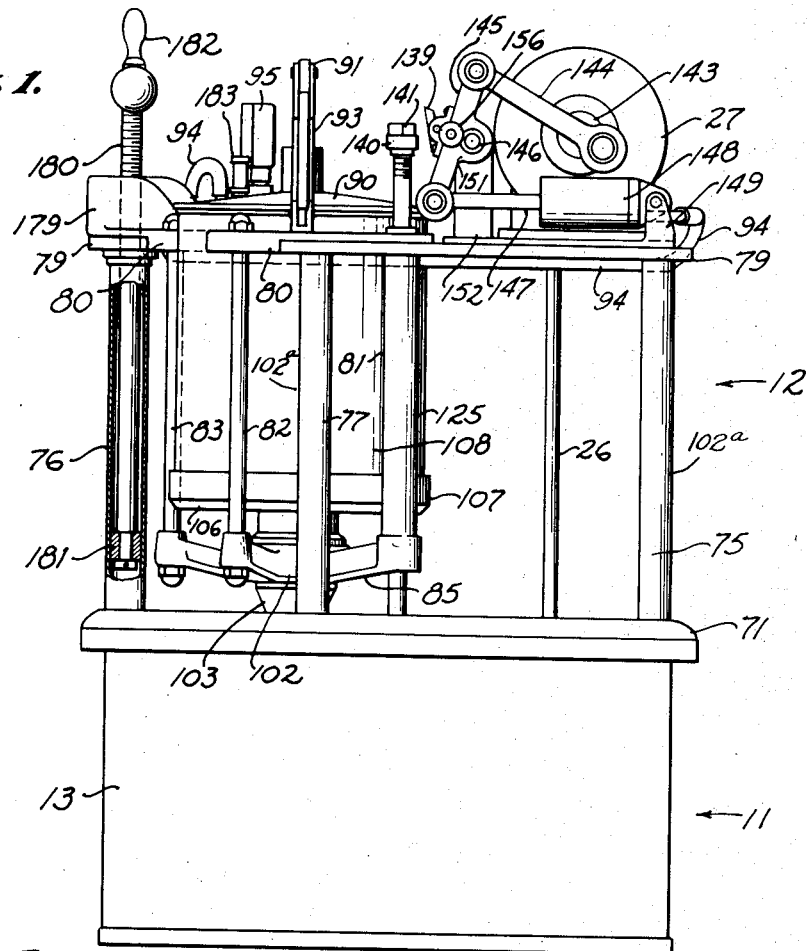
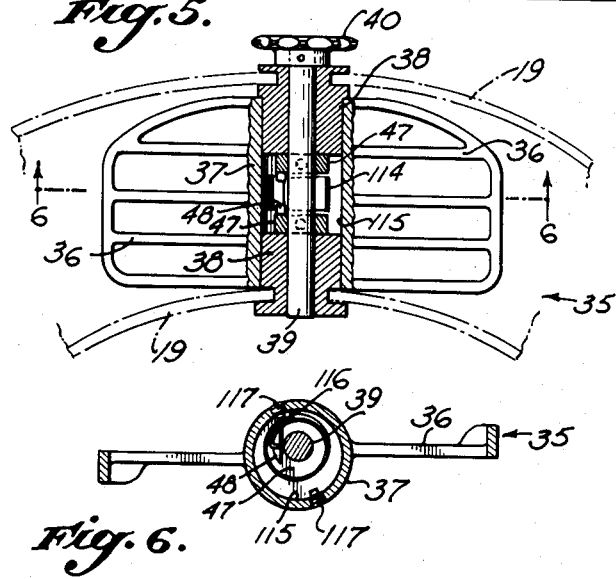
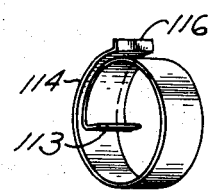
INVENTOR.
ERNEST E. LINDSEY
BY
George R. Bliss
ATTORNEY.

Aug. 30, 1955  E. E. LINDSEY  2,716,377
MEANS FOR THE MANUFACTURE OF ARTICLES OF FOOD
Filed May 26, 1950  5 Sheets-Sheet 2

INVENTOR.
ERNEST E. LINDSEY
BY George R. Bliss
ATTORNEY

Aug. 30, 1955  E. E. LINDSEY  2,716,377
MEANS FOR THE MANUFACTURE OF ARTICLES OF FOOD
Filed May 26, 1950  5 Sheets-Sheet 3
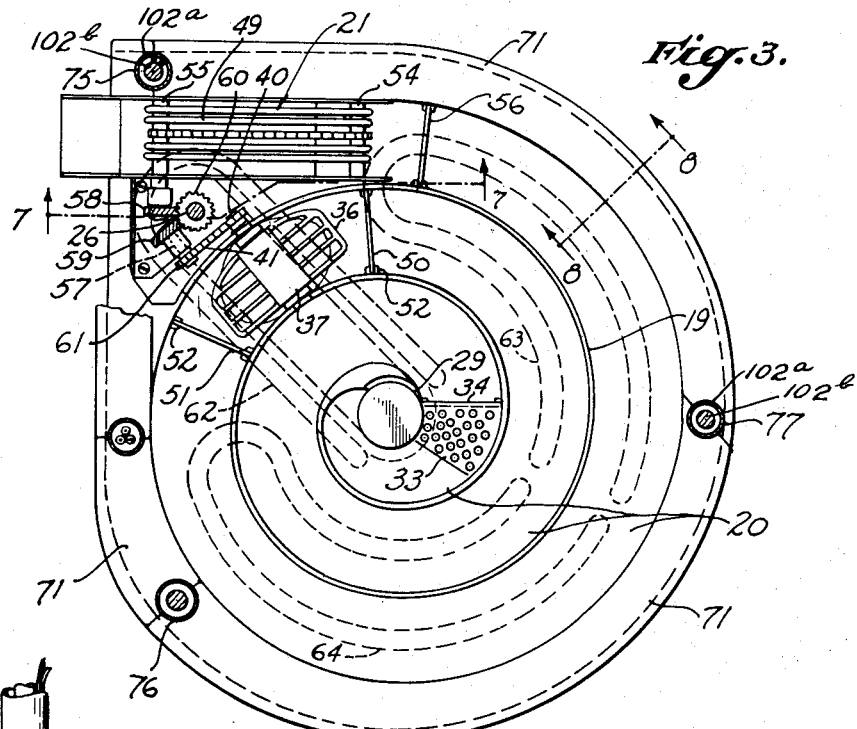
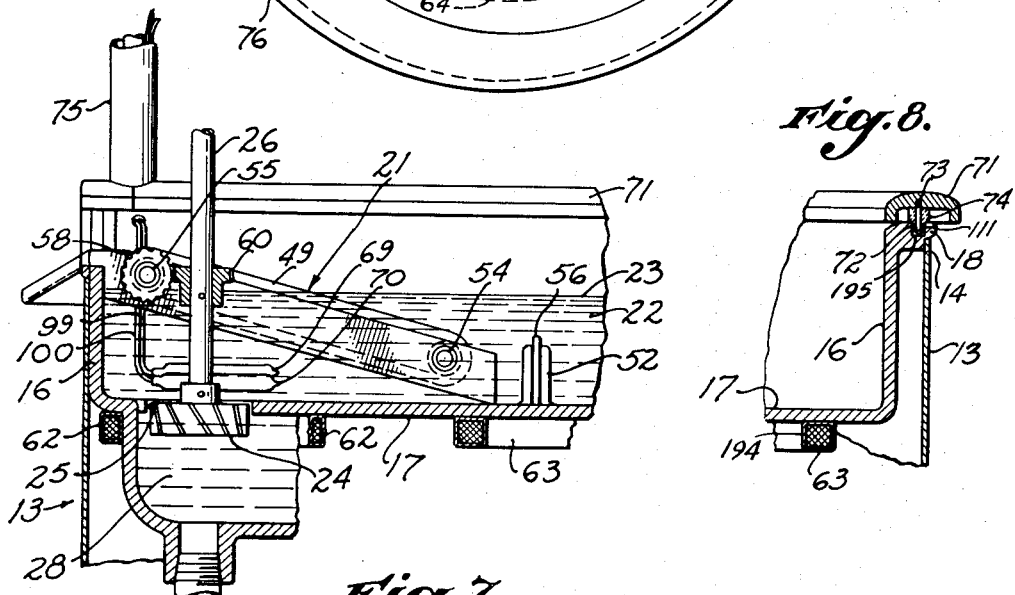
INVENTOR.
ERNEST E. LINDSEY
BY
George R. Bliss
ATTORNEY.

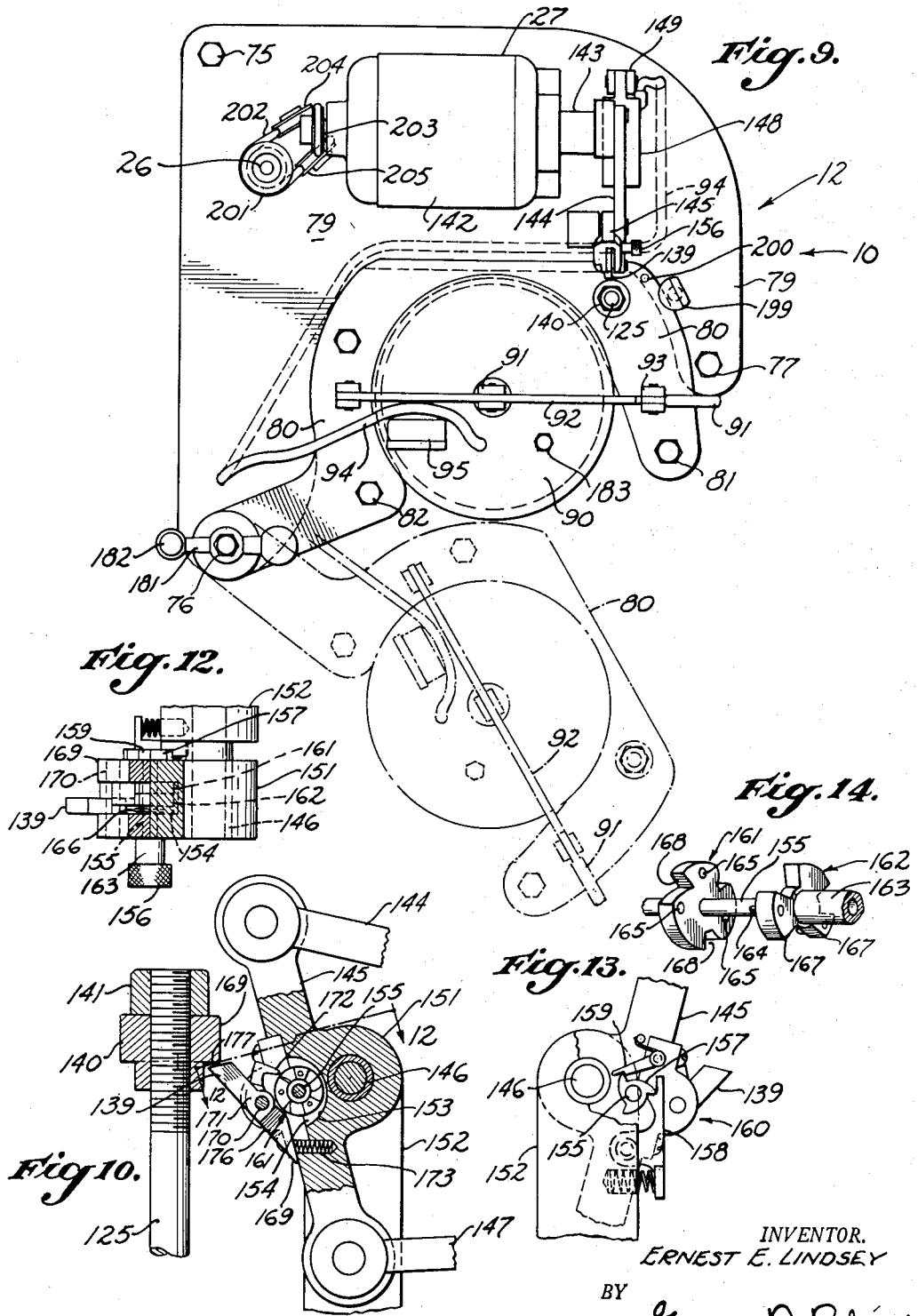

Aug. 30, 1955  E. E. LINDSEY  2,716,377
MEANS FOR THE MANUFACTURE OF ARTICLES OF FOOD
Filed May 26, 1950  5 Sheets-Sheet 5
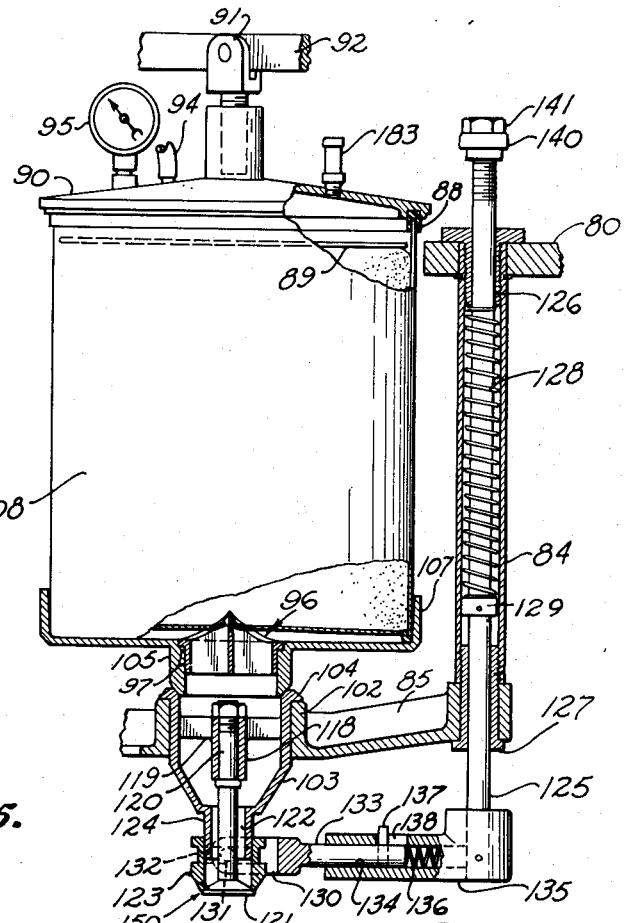
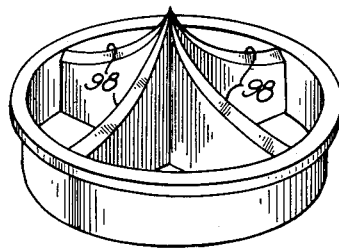
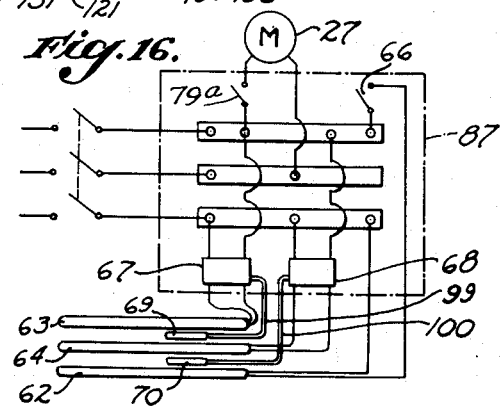
INVENTOR.
ERNEST E. LINDSEY
BY
George R. Bliss
ATTORNEY.

United States Patent Office 2,716,377
Patented Aug. 30, 1955

2,716,377

MEANS FOR THE MANUFACTURE OF ARTICLES OF FOOD

Ernest E. Lindsey, Los Angeles, Calif.

Application May 26, 1950, Serial No. 164,457

13 Claims. (Cl. 99—406)

This invention relates to a machine for cooking articles of food, and particularly to a machine for converting a single homogeneous mass of previously prepared uncooked or partially cooked mix or dough into a large number of relatively small portions of the mix of a desired shape and size and then cooking them, to produce a large number of the finished products. The invention is shown herein as embodied in a machine for making doughnuts, cookies and similar articles, and especially for making miniature doughnuts, but its features and principles have a wide field of application in the art of cooking machines. By varying the mix, many products of varying character and varying appeal to the sense of taste may be manufactured in a machine of this invention, and by varying the cutting and shaping means, the finished product may be given different shapes and sizes as desired.

The embodiment of the invention shown herein and many of its features lend themselves admirably to a method of manufacturing and merchandising doughnuts and other cooked articles, which consists of preparing at a central plant a large batch of the mix, packing it in many preferably lightweight and disposable inexpensive containers, distributing the containers to many locations, such as grocery stores, department stores, and the like, at each of which a machine of this invention is prominently installed, inserting the containers in the machines, and then in the presence of the customers converting the mix in the container into a large number of the final cooked products for immediate and on-the-spot sale. This method has the obvious advantages of inexpensive, controlled, sanitary, standardized, efficient preparation of a high quality mix, which may be kept under proper storage conditions for a substantial period of time, of the sales appeal of processing this mix to produce the cooked product in the presence of the customer, and of marketing it while freshly cooked to a large number of buyers in many scattered places. The moving parts of operating machinery are always interesting to persons, and the moving parts of the machine of this invention, which are preferably made more easily visible by absence of opaque casing or frame structures, attract the attention of the passersby who then stop to watch. Sales of the freshly cooked article follow. This phase of the use of the invention was in mind in perfecting the invention and some of its features are directly related to its use in such a method of manufacturing and merchandising.

One of the objects of the invention is to provide a cooking machine with a novel and accurate control of the cooking temperature.

Another object is to provide a means for turning the cooking articles during the cooking process adaptable to a method of cooking characterized by floating the cooking articles in a moving stream of cooking fluid, which shall be positive in its action and which does not interfere with the even downstream passage of the cooking articles at regular intervals under the moving force of the stream of cooking fluid.

Another object is to provide a turning means which shall be co-ordinated with that part of the machine which deposits, at a variable rate, the raw dough portions in the cooking stream.

Another object is to provide compact power transmitting means for moving the stream of cooking fluid, for turning the partially cooked dough portions, and for driving the conveyor which lifts the cooked articles from the stream of cooking fluid and deposits them in a receptacle.

Another object is to provide a means of receiving the raw dough portions from the mechanism of the machine which forms and cuts the dough portions, which will not deform the dough portions and will start them evenly and at regular intervals down the stream of cooking fluid.

Another object is to provide a machine which may be operated in safety and by store employees without expert knowledge of machinery.

Another object of the machine is to provide for proper correlation of the flow speed of the cooking fluid with the turning means, and with the rate at which the dough portions are dropped into the cooking stream.

Another object is to provide a cooking machine which shall be inexpensive to manufacture, easy to operate, adjust and maintain, of compact assembly, which has many readily visible moving parts.

Other objects and advantages are associated with details of construction and will be apparent from the drawings and following description.

In the drawings:

Figure 1 is a side elevational view of the machine;

Figure 3 is a horizontal view of the machine taken along the line 3—3 of Figure 2;

Figure 5 is a plan view, partly in section, of the inverter;

Figure 6 is a sectional view taken along the line 6—6 of Figure 5;

Figure 7 is a vertical sectional view of the cooker taken along the line 7—7 of Figure 3;

Figure 8 is a fragmentary sectional view taken along the line 8—8 of Figure 3;

Figure 9 is a top plan view of the machine;

Figure 10 is a detailed view, partly in section, of the mechanism for driving the air compressor and dough cutter, taken in the direction of the arrow 10 of Figure 9;

Figure 11 is an elevational view, partly in section, of the dough portion die and cutter, the drive therefor, and the dough container holding means;

Figure 12 is a sectional view taken along the line 12—12 of Figure 10;

Figure 13 is a view of the mechanism of Figure 10 looking at it in the opposite direction;

Figure 14 is an exploded perspective view of the ratchet device of the mechanism of Figure 10;

Figure 15 is a detailed enlarged perspective view of the cutter for the bottom of the dough carton;

Figure 16 is a diagrammatic view of the electrical circuit;

Figure 18 is a detailed perspective view of the turnover spring.

Figure 2:
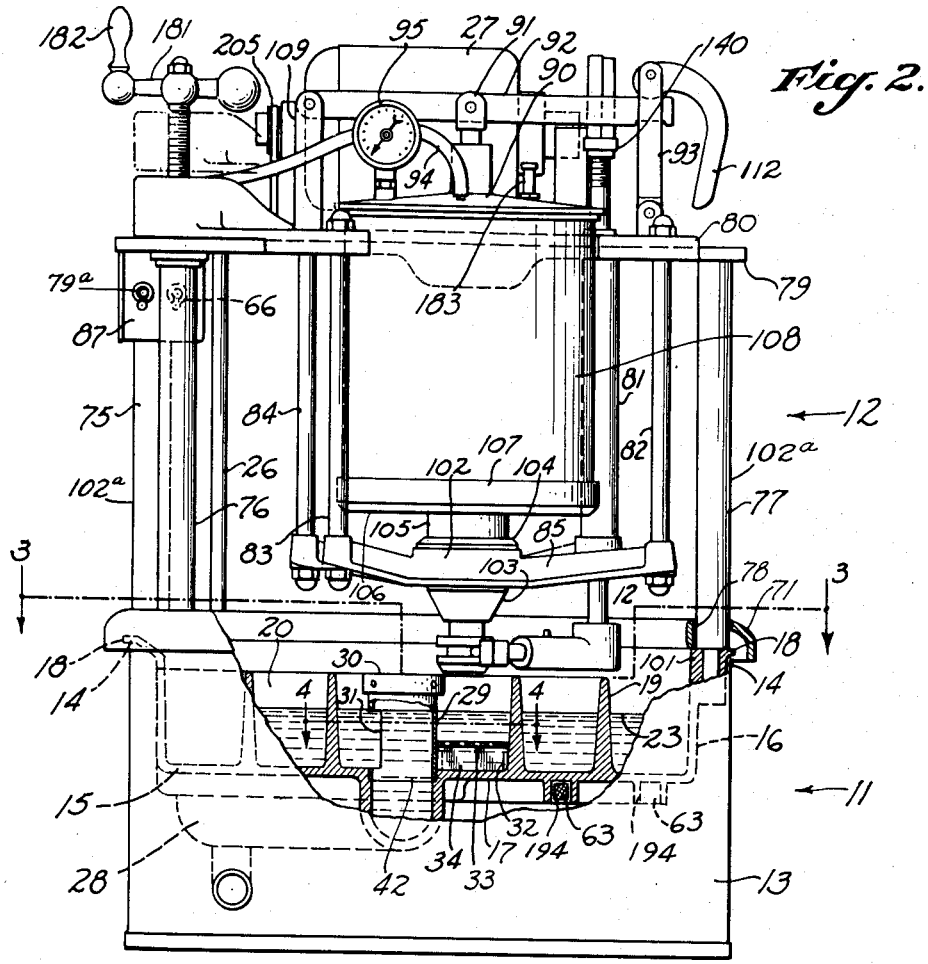
Figure 2 is a front elevational view of the machine as viewed from the position of the operator, a portion of the side wall of the cooker being broken away to show some of the interior structure of the cooker.

The machine may be considered as comprising two principal parts, the cooker indicated as a whole by the numeral 11 and the superstructure indicated as a whole by the numeral 12. On the structure is mounted the means for receiving and supporting one of the cylindrical carton containers of dough, the means for expressing the dough from the containers through the forming and cutting devices, and the devices for forming and cutting the dough of the container into small annular dough portions, which when cooked, are the doughnuts which the machine is designed to produce. After these dough portions are formed and cut, they are dropped into a stream of hot cooking fluid which circulates in the cooker 11 directly beneath the superstructure 12.

This application is a continuation in part of Application Serial No. 671,193 of Ernest E. Lindsay, filed May 21, 1946, now Patent No. 2,536,649, for a method and machine for manufacturing articles of food. This earlier application also discloses a doughnut cooking machine having a cooker and superstructure. The claims of the earlier application are confined to the superstructure and to combinations of certain co-operatively related devices on both the superstructure and the cooker. This application relates to the cooker, and to combinations of newly disclosed co-operatively related devices of the cooker and superstructure. The claims herein presented upon the cooker are for the most part definitive of the cooker described and presented in the earlier application. The remaining claims relate to detailed improvements upon the cooker as described in the earlier application which are disclosed for the first time in this application.

The cooker 11 has a cylindrical shell-shaped base 13. The upper circular edge 14 of this shell supports a cooker pan 15 having side walls 16 and a bottom wall 17. The side walls 16 are formed at their upper edges with flanges 18 which rest upon the upper edge 14 of the base 13.

From the bottom wall 17 a vertical web 19 extends upwardly presenting in horizontal plan view, a spiral as shown in Figure 3, providing a spirally-shaped channel 20 extending from the center of the cooker pan in widening convolutions to a discharge area 21. This channel is filled with a suitable cooking fat 22 to a level as indicated at 23 on Figure 2. The fat is replenished and maintained by any suitable means (not shown), such as an air-tight elevated vessel with a pipe extending from its lower portion to the surface level of the fat in the channel. This level may be adjusted by adjusting the level of the lower end of the pipe.

The cooking fat 22 is circulated in the spiral channel 20 from the center of the pan outwardly by an impeller 24 mounted to rotate in an outlet 25 in the bottom wall 17 of the cooking pan 15 in the discharge area 21 at the outer end of the channel as shown in Figure 7. This impeller is carried by a drive shaft 26 which extends upwardly from the cooker into the superstructure and is driven by a motor 27 mounted on the superstructure in a manner to be presently described. The cooking fat is drawn downwardly by the impeller through the aperture 25 and propelled through a duct or manifold 28 underneath the cooker pan and thence upwardly through a short vertical tube 29 which connects with the duct 28 at an aperture 42 of the bottom wall of the pan, being rotatively seated upon an annular shoulder 43 in this aperture, and extending from the bottom wall of the pan to the level of the upper edges of the web 19. The web 19 takes off initially from the wall of this tube. The tube 29 is closed at its upper end 30 by an integrally formed cap which is annularly grooved at 43 for rotative engagement with the annular upstanding flange 44 on the web wall 19, and is drilled at several points in its rim to provide holes for the insertion of small rods by which the operator may rotate the tube 29. The tube may be manually rotated clockwise as viewed from above in Figure 4 to vary the degree of opening of the port 31 to control the rate of flow of the cooking fat as it passes into and along the spiral channel under the propelling force of the impeller 24.

Figures 4, 17:
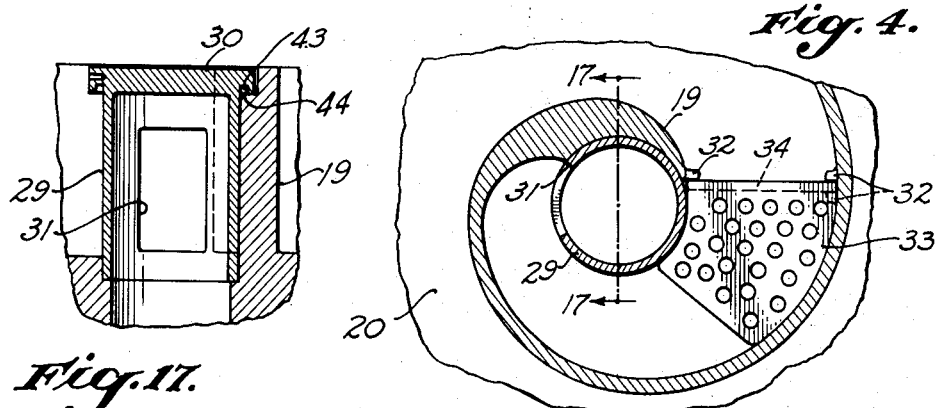
Figure 4 is a sectional view taken along the line 4—4 of Figure 2.
Figure 17 is a sectional view taken along the line 17—17 of Figure 4.

The dough portion which becomes the cooked doughnut is dropped from the superstructure on to a drop plate 33 which is stationarily but removably secured to and between the walls of the channel 20 a short distance from the point of ingress of the cooking fat into the channel through the port 31. The drop plate 33 is submerged in the stream of cooking fat and its downstream end is bent downwardly to form a dam 34. The plate is perforated as shown in Figure 4. The lower portion of the stream of cooking fluid, when it reaches the drop plate, is diverted upwardly through these perforations by the dam 34. The raw doughnut, when dropped upon this plate, is of greater specific gravity than the cooking fluid but is held above the bottom of the channel by the plate for a brief interval of time, during which it begins to cook and in the cooking process, become sufficiently buoyant to rise from the plate and begin its floating passage around the convolutions of the spiral channel. The small jets of cooking fluid forced upwardly through the perforations of the drop plate insure a rapid rise of the doughnut from the plate and prompt movement away from it into the fat stream to make way for the raw doughnut which will next be dropped from the superstructure. The handling of the raw doughnut by a drop plate, so constructed and installed, is such that it is not deformed at the start of the cooking process by its own fall or by the fall of the following raw doughnut upon it. The drop plate is removable for occasional cleaning of its surface and its perforations by lifting it vertically, the dam 34 sliding between the guides formed on the side walls of the web 19.

The doughnuts are cooked on one side during the first portion of their travel along the channel and are cooked on the reverse side during the latter half of their journey to the discharge area. Various devices and expedients have been used in doughnut machines to turn the doughnut over at the proper juncture. According to this invention, the doughnut is turned over by an inverter generally indicated by the numeral 35 (see Figures 5 and 6). The inverter 35 consists primarily of a pair of grates 36 oppositely extending from a horizontal hub 37 preferably integrally formed with the grates. This hub 37 is journaled on two stationary end bearings 38, which are slotted at their ends to slide into non-rotative and removable position on the two adjacent and opposite sections of the web 19. The bearings 38 are eccentrically bored to rotatively mount shaft 39. This shaft is driven by a sprocket wheel 40 pinned to its outer end (see Figure 3), which in turn is driven by a sprocket chain 41 and power transmitting devices to be later described. Rings 47 are pinned to the shaft against the inner end face of the bearings 38, respectively, and each has an axially extending nib 48 slotted on its radially outer face to receive the ends respectively of a cross piece 113 of a spring 114 which spans a chamber 115 between the rings 47 within the central chamber of the hub 37. The spring shown in perspective in Figure 18, extends circumferentially around the chamber 115, terminating in a radial tip 116 which engages and pushes anti-clockwise, as seen in Figure 5, one of the two oppositely disposed, inwardly and centrally projecting lugs 117 on the hub 37. When the lug 117 has passed below the horizontal plane of the shaft axis, the tip 116 of the spring slips past the lug 117 due to the eccentricity of the bearings 38, the grate stops its turnover movement, as it drops the doughnut, and dwells in an eleven o'clock position until the spring tip contacts the other lug 117. It then turns from the eleven o'clock position to a five o'clock position, ready to pick up another doughnut, while the other grate is picking up the next doughnut as it moves from a five o'clock position over the top to an eleven o'clock position. The spring yields in the event of an obstruction blocking movement of the inverter. The lugs are radially adjustable inwardly and outwardly of the hub 37 to vary the juncture at which the grates are picked up and dropped by the spring tip 116.

By reason of the eccentric mounting of the inverter and its driving connection with the shaft 39, the smoothly continuous rotating movement of the shaft is caused to give to the grates a half revolution and then a dwell, succeeded by other half revolutions and dwells as long as the machine is in operation. That one of the grates which extends upstream at any particular moment receives an oncoming doughnut floating toward it and halts its downstream movement when the forward edge of the doughnut contacts the hub of the inverter. The grate in its dwell position is inclined downward at about a five o'clock position to facilitate the floating of the doughnut into position upon it. Upon the next movement of the inverter, the doughnut is picked up, carried over the top of the hub without relative movement of the doughnut upon the grate, and dropped in inverted position in the stream of cooking fluid on the other side of the inverter. The inverter then remains stationary for a sufficient time interval to permit the inverted doughnut to travel downstream far enough to be clear of the other grate carrying the next oncoming doughnut.

To facilitate the inverting of the doughnuts and to prevent piling up of the doughnuts either just ahead of or just beyond the inverter, a pair of weirs 50 and 51 are mounted across the channel, one just upstream from the inverter and the other just downstream from the inverter. These weirs extend from the bottom of the channel well up to the surface of the stream of cooking fluid, causing the cooking fluid as it passes over their upper edges to travel at greatly increased speed. As the doughnut approaches the upstream weir 50 it will suddenly speed ahead to the inverter hub, will be elevated and dropped back in the fluid stream, and will be immediately pulled ahead from the inverter by the rapidity of flow of the cooking fluid over the downstream weir 51. These weirs, while they are held stationary in their proper positions, may be readily removed for cleaning purposes. They are held frictionally or by gravity in guideways 52 on the opposite walls of the web 19 and if required, may be adjusted in these guideways to vary their elevation for regulating the acceleration of the flow of cooking fluid to and from the inverter grates.

At the end of the spiral channel an endless platform conveyer 49 of the chain type is suitably mounted on horizontal cross channel shafts 54 and 55, of which the upstream shaft is submerged in the cooking fluid and the downstream shaft is elevated above the cooking fluid in suitable position for dropping the cooked doughnuts into a receptacle or on to another conveyer to be carried away to any desired point. This conveyer is mounted in the discharge area 21 just downstream from a weir 56 similar to and mounted similarly to the weirs 50 and 51, which serves to speed up the doughnut and cause it to move well on to the conveyer, eliminating the chance of the doughnuts piling up at the lower end of the conveyer.

The conveyer shaft 55 and a stub shaft 57 appropriately mounted on the cooker pan have secured to them helical gears 58 and 59 respectively, which mesh with a helical gear 60 secured upon the drive shaft 26. The stub shaft 57 carries at its other end a sprocket wheel 61, which, through the means of the sprocket chain 41 and sprocket wheel 40, drives the inverter.

The cooking fluid is heated by three elongated heating elements 62, 63, and 64 which are mounted on the undersurface of the bottom wall 17 of the cooking pan, as shown in Figures 2, 7, and 8 to present the plan contours shown in Figure 3. Heating element 62 is arranged in the shape of an elongated U with its free ends astride the position of the ingress tube 29, its legs extending from this tube transversely of the position of the web convolutions vertically thereabove, to the yoke of the U which lies under the discharge area 21 of the channel containing the cooking fluid. The other two heating elements 63 and 64 are mounted somewhat symmetrically on either side of the element 62, each being in the shape of a curved U with its free ends adjacent the corresponding free ends of the other of these two heaters, the legs curving around from these free ends to a yoke adjacent the discharge area 21, each leg of the U lying substantially centrally below a portion of the channel 20 of the stream of the cooking fluid. These heating elements are installed in channels 194 and then sealed in place with molten aluminum, which may be readily removed with the imbedded heaters if necessary.

The heating element 62 is controlled by a manually operable switch 66 (see upper left-hand side of Figure 2 and Figure 16), by which it may be turned on or off. No control is provided for regulation of this heater other than the fully on or fully off position.

The two other heaters 63 and 64 are controlled by two electrically operated thermostatic switches 67 and 68, respectively. Thermostats 69 and 70 for these switches, respectively, are shown in Figure 7 immersed in the cooking fluid.

To start the cooker, the manual switch 66 is closed. The switches 67 and 68 are both automatically in the "on" position under the control of the thermostats 69 and 70. When the desired cooking temperature is, for example, 385°, the thermostat 69 is adjusted to turn off the heater 63 at a few degrees below 385°, for example at 380°, and thermostat 70 to turn off the heater 64 at 385°. As the temperature drops below 385°, the heater 64 will be first turned on and if the drop continues the heater 63 will be turned on by its thermostat at 380°. The manually operated heater is designed to raise the temperature of the fat to a degree somewhat less than 385°, and in any event should be turned off at 385°, or earlier during the heating-up period, but if this is overlooked, the temperature will not unduly rise due to the turning off of the switches 67 and 68. By setting the thermally-controlled switches to turn off and on at slightly different temperatures, there is less variation from the desired cooking temperature as there is less tendency for "hunting" in the operation of the thermal control.

The main single throw, three pole power line switch is shown in Figure 16. It is not shown in any of the views of the machine or its parts. The motor switch 79a and heater switch 66 of the diagram shown in Figure 16 are shown in Figure 2, mounted on the control box 87. Mercury conduits 99 and 100 lead from these thermostats 69 and 70 up inside the standard 75 and under the plate 79 to the micro switches 67 and 68 in the control box 87.

A guard rail 71 is provided as shown in Figures 1, 2, 3, 7, and 8 for protecting the arms of the operator of the machine from being burned by the highly heated flanges 18 of the cooker pan as she reaches over them in placing the dough cartons in the superstructure 12, or for correcting conditions in the cooker. This guard rail, as clearly shown in Figure 8, has sockets centrally located in its undersurface between the two downwardly projecting flanges 72 which engage the fastening screws 73 in the heat insulating spacers 74, which are separably seated on the cooking pan flanges 18 by means of lower pins 111 formed on the spacers 74 and projecting into sockets 195 in the flanges 18. The sockets 195 are sufficiently deep that the heads of the screws 73 do not contact the bottom of the sockets. This guard rail, for convenience of placement upon the cooker, is made in sections, and preferably of metal but may be made of a material of low thermal conductivity. The superstructure is supported on the cooker by three standards 75, 76, and 77 and the ends of the guard rail sections abut each other at the places where these standards project upwardly from the cooker pan. To prevent the heat transferred from the cooking fluid to the standards of the cooker pan from being in turn transferred to the guard rail 71, the guard rails are made to provide a clearance space 78 between their ends and the standards for keeping the standards out of direct contact with the guard rail sections.

The frame of the superstructure 11 comprises a stationary horizontal plate 79 which is secured to the upper ends of the three standards 75, 76, and 77, and upon which is mounted the power mechanism of the machine, and further comprises a swingable horizontal plate 80, which is hinged on a vertical axis centrally of the standard 76, and may be swung about its axis substantially in the plane of the stationary plate as shown in Figure 9 in a manner to be more particularly described later. Upon the movable plate 80 is mounted the dough holding and doughnut forming devices of the machine from which the raw doughnut is dropped on to the drop plate 33 of the cooker.

The standards 75 and 77 each comprise a central tension rod 102b with nuts for drawing the plate 79 towards the lugs 101 on flanges 18 of the rim of the cooker pan, and further comprise an outside strut tube 102a for spacing apart the flanges 18 and the plate 79.

The plate 80, which is in the form of a hook or interrogation mark, with the outer end of the straight leg thereof at the pivot axis, has dependingly secured to it four rods 81, 82, 83, and 84 which support at their lower end a spider 85, as shown in Figure 2. A hub 102 of this spider supports a nozzle 103, the upper rim of which is flanged outwardly at 104 to rest upon the upper end of the hub 102. The annular inner surface of this flange is beveled inwardly and downwardly to matingly receive a similarly formed surface on the lower end of a cylindrical neck 105 extending downwardly from an annular plate 106 which is upwardly flanged at its outer rim at 107. This plate and flange are of a diameter to receive within the flange in a position resting upon the plate a cylindrical portable dough container 108.

When the dough holding carton 108 is to be placed in position in the machine, with its bottom resting on the plate 106, the cover is removed and a rubber gasket 88 is placed upon the upper rim of the side wall of the carton (see Figure 11), the carton is placed in the machine, a pressure plate 89 is placed in horizontal position on the upper surface of the dough to uniformly apply the air pressure to the dough as will be presently explained, and the carton is hermetically sealed by a cover plate 90. This plate is threaded by means of a central upwardly extending boss to the fulcrum 91 of a lever 92, which is pivoted to the upper end of an upright bar 109 fastened to the movable plate 80. The cover plate is clamped tightly to the upper edge of the carton with the sealing gasket 88 in place between them by means of a link 93 pivoted to the plate 80 on the other side of the carton, and a cammed clamping handle 112 pivoted to the upper end of the link 93 in position to force the free end of lever 92 downwardly.

Compressed air is led into the upper end of the lidded carton through a hose 94 which is attached suitably to a hole in the cover plate 90. A pressure gauge 95 is installed on the plate 90. A multiple bladed cutting knife 96 constructed as shown in Figure 15 is mounted on a shoulder 97 in the upper end of the neck 105, just below the bottom wall of the dough carton. When the clamping handle 112 is operated to push downwardly the carton (see Figure 11) the blades 98 of the knife slit the bottom of the container, providing a plurality of radiating cuts and forming corresponding pointed flaps in the bottom of the carton which bend downwardly when the dough is subjected to air pressure from above, permitting the dough to pass into the neck 105 and thence into the nozzle 103.

The nozzle 103 supports in a central cylindrical holder 118 which is the hub of a spider 119 formed integrally with the nozzle, a stem 120 for a widely flaring conical deflector 121, which the stem holds in position centrally below the lower end of the nozzle 103, leaving an annular passageway 122 around the stem for the dough to be extruded. When the dough leaves this passageway 122, it strikes and is deflected outwardly by the deflector 121 to form a flat ring of dough. This ring is severed at the rim of the deflector by an annular cutter 123, which consists of a sleeve beveled inwardly at its lower end which is sized and shaped to normally contact the upper surface of the deflector. The cutter is sleeved on a lower hollow cylindrical neck 124 of the nozzle 103, this neck being long enough to allow the vertical reciprocation of the cutter between a lower limit position in which the cutting edge of the cutter 123 contacts the upper surface of the outer rim of the deflector, and an upper limit position in which the cutting edge is about at the level of the lower end of the neck 124.

This cutter is vertically reciprocated at an adjustable number of strokes per minute, to and from a variable upper level, the cutting edge traveling from this upper level adjacent the lower edge of the neck 124 to the level of the outer edge of the deflector 121. To accomplish the reciprocation of the cutter and to provide for its variable length of stroke, the rod 84 supporting the spider 85 is a tube larger in diameter than the other three supporting rods and houses within it a reciprocating rod 125, which is slidably mounted in sleeves 126 and 127, secured in the upper and lower ends, respectively, of the tube 84. A coiled spring 128 is seated under compression between the upper sleeve 126 and a collar 129 pinned to the rod 125.

A yoke 130 having trunnion pins 131 which engage the annular groove 132 in the cutter 123, is formed on the outer end of a rod 133. The rod 133 is telescopically slidable in the bore 134 of an arm 135 pinned to the lower end of the rod 125. The rod and yoke are urged outwardly in proper position for engagement of the trunnion pins with the groove in the cutter by a spring 136 and a limit pin 137 projecting upwardly from the rod into the slot 138 of the arm 135. When it is desired to clean the nozzle 103 down to the deflector 121, the plate 106 is lifted from the nozzle 103, the yoke 130 and rod 133 are pressed inwardly and the assembled nozzle 103, deflector 121 and cutter 123 are lifted from the spider hub 102 and may then be thoroughly cleaned.

The rod 125 is lifted intermittently for each dough cutting operation by the cutter 123 by the engagement of a lifting pawl 139 (see Figure 10), with the under side of a shoulder on a ring nut 140 threaded on the upper end of the rod 125 and locked in position by the nut 141. This lifting pawl, in a manner to be presently explained, lifts the rod 125 a vertical distance which may be variably adjusted by threading the nuts 140 and 141 along the rod 125, and a desired number of lifts per minute in correlation with the inverter 35 may be obtained by adjusting the mechanism which drives the lifting pawl 139. Thus the number of raw doughnuts formed, cut and dropped into the cooking stream per minute, as well as the size of each portion of dough for the doughnut, may be accurately determined. The base maximum rate at which the pawl 139 is lifted, and as a result the base maximum rate at which dough portions are dropped onto the drop plate is slightly less than the number of revolutions of the shaft 39 of the inverter. For instance if the drop rate is 24 per minute the shaft 39 may be geared to the motor to rotate at a rate of 25 or 26 R. P. M. Since the shaft 39 turns once for each half turn of a platform 36, the inverter will then turn over one or two more times per minute than the dough portions will be dropped into the frying channel. Thus if in any one minute the travel of the doughnuts is such that a doughnut falls behind allowing the inverter to make an idle turn, the inverter makes an extra turn or two in each minute relative to the number of doughnuts which reach the inverter in that minute. Otherwise, if the speed of dropping the dough portions and turning the doughnuts were the same, and perchance the inverter for one reason or another made an idle turnover movement, the doughnuts would pile up two at a time in front of the inverter, and as more misses of the turnover occurred, this line of waiting doughnuts would steadily increase and the machine would eventually fail to function.

On the other hand the margin of difference between the drop rate and turnover rate should be as near unity or a simple proper fraction of unity as possible, so that the procession of doughnuts floating down the channel may be evenly spaced with pleasing and attractive effect on the eye of the observer, with no long gaps between doughnuts. It will be observed that the weirs 50 and 51 not only speed up movement of the doughnuts into and out of the inverter without interference from the platforms 36, but the weir 50, if one doughnut closely follows and touches another, provides an augmented stream force which holds the lead doughnut against the hub 37 by pushing the following doughnut against it.

In addition to adjustment of the nuts 140 and 141, the size of the doughnut may also be controlled by adjusting a relief valve 183 on the cover plate 90 to vary the extrusion air pressure applied to the dough in the container. It will be noted that the cutter is lifted by the lifting pawl 139, which as will presently appear is power driven by the motor 27, and that the cutter is driven downward by a sharp sudden spring actuated movement when the lever 139 is disengaged from the ring nut 140.

The motor 27 by a gear reduction drive within the right end of the motor (see Figure 9) turns the shaft 143 at a given speed. 24 revolutions per minute has been found a convenient speed. Shaft 143 through connecting rod 144 oscillates the rocker arm 145 about its median pivot pin 146 carried by a standard 152 mounted on plate 79. The lower arm of the rocker arm is pivotally connected to the piston rod 147 of the air pump 148, which is pivotally mounted at its rear end on a standard 149, also mounted on plate 79. Air compressed by this pump is conducted by the hose 94, underneath plate 79, as shown in dotted lines on Figure 9, and up through plate 79 at the front left-hand corner of that plate, and thence to a hose connection on the top of the cover plate 90, applying air pressure to the upper surface of pressure plate 89, forcing the dough downwardly of the container 108 and through the nozzle 103 and the annular opening 150 between the deflector and neck 124, as permitted by the reciprocating movements of the cutter 123.

Referring to Figures 10, 12, 13, and 14, the median portion of the rocker arm 145 has a right hand boss 151 by which it is pivoted to the pin 146, carried by the standard 152. The axis of this pivotal connection is displaced from the center line of the rocker arm 145. The center left-hand portion of the rocker arm is slotted at 153 to provide a chamber 154 across which is mounted in the rocker arm a pin 155 which projects a short distance beyond the side faces of the rocker arm, as seen in Figure 12. On the one projection is secured a knurled manually operable head 156, and on the other projection is secured a three-pointed star wheel 157, as shown in Figure 13. This star wheel, together with the pawl 158 mounted pivotally on the standard 152, biased to be urged against the star wheel, and the pawl 159 pivotally mounted on the arm 145 biased to be urged against the star wheel, constitute an escapement movement designated as a whole by the numeral 160 which turns the pin 155 through an angle of 120° in an anti clockwise direction (see Figure 13) for each complete oscillation of the arm 145. If, then, the rocker arm makes twenty-four complete oscillations per minute, and the star wheel three 120° intermittent movements for each oscillation of the rocker arm, it is apparent that the pin 155 will make eight complete turns per minute, each turn being divided into three 120° intermittent movements, and that these 120° movements will be in an anti-clockwise direction as viewed in Figure 13, and in a clockwise direction as viewed in Figure 12.

Upon that part of the pin 155 which spans the chamber 154 are fixedly secured, a notched wheel 161, and rotatably mounted a masking wheel 162; see Figures 10, 12, and 14. The masking wheel has a tubular extension 163 to which the knurled wheel 156 is fixedly secured. The masking wheel also has two small locking pins 164 which at the selection of the operator may be seated in any one of four certain pairs of locking holes 165 and notches 168 formed in the notched wheel 161. A coiled spring 166 holds the notched wheel 161 and masking wheel 162 in lateral engagement with the two locking pins 164 seated in two of the six holes and notches 165 and 168. The operator by withdrawing the masking wheel against the pressure of the spring 166 may free the locking pin and then turn the masking wheel to a new position and release the masking wheel under the action of the spring to engage another combination of two holes and notches in the notched wheel. The masking segments 167 of the masking wheel and the notches 168 of the notched wheel are so arcuately dimensioned and so arcuately spaced from each other that in one of the four locking positions, one only of the notches 168 of the notched wheel 161 is opposite an opening in the masking wheel; in another of the four locking positions, two only of the notches 168 are opposite openings in the masking wheel; in a third locking position, all three of the notches in the notched wheel are opposite openings in the masking wheel; and in a fourth locking position, all three notches are masked.

A pair of bearing blocks 169 are bolted to the rocker arm 145 on either side of the chamber 154 to provide bearings for a small pin 170 upon which is journaled a pawl 171, the dog 172 of which is urged by the spring 173 into engagement with the rim of the notched wheel 161. The lifting pawl 139 is pivoted to the pawl 171 at 170 and is so related to a shoulder 176 on the pawl 171 that it cannot swing downward with respect to the pawl 171 but can swing upwardly with respect thereto. As the rocker arm is in its clockwise swing as viewed from Figure 10, the shaft 155 is stationary with respect to the arm, and as it is in its anti-clockwise swing, the shaft 155 is rotating through 120° with respect to the arm. Assuming now that all of the notches 168 are masked, the dog 172 rides past all the notches without entering any one of them. The lifting pawl 139 is then held in its outwardly inclined position, as shown in Figure 10, and engages the shoulder 177 on the ring nut 140 and lifts the rod 125 until the swing of the rocker arm 145 pulls the lifting pawl 139 out of engagement with the ring nut shoulder 177, whereupon the spring 128 gives the cutter knife 123 a sudden downward movement. By regulation of the position of the ring nut, the juncture at which the lifting pawl is separated from the ring nut may be varied to pass smaller or larger portions of dough through the opening 130. With all the notches 168 masked by masking wheel 162, it is apparent that three dough portions will be dropped for each revolution of the shaft 155, or twenty-four dough portions per minute, since the gear reduction drive shaft of the motor makes twenty-four revolutions per minute. As the lifting pawl slides downward along the rim surface of the lifting pawl, the escapement movement is turning the shaft 155 through the next 120°, and the dog 172 is riding over a 120° arc of the notched and masking wheels. When the pawl 139 reaches the lower edge of the rim surface of the ring nut 140, it falls by its weight into its extreme outward position ready for the next lifting engagement with the ring nut shoulder 177.

It is also apparent that if the masking wheel is adjusted to mask two, one or none of the notches 168, the dog 172 will enter the open notches and cause the cutter to drop sixteen, eight or no doughnuts per minute, since the lifting pawl 139 will be permitted to be moved by the spring 173 in a clockwise direction (see Figure 10) far enough to clear the ring nut as the rocker arm is making its clockwise swing.

The plate 80 is formed with a boss 179 which is provided with an internally threaded bore for the reception of the threaded lifting rod 180. This rod at its lower end is held in spaced relation with the tube 76 by the sleeve 181 which slides within the tube 76, and engages an annular portion of the rod 180 of reduced diameter. The upper end of the rod 180 is provided with a crank arm 181a and handle 182, for rotating the lifting rod 180. By rotating the rod 180 in one direction, its lower end is first moved into engagement with the flange 18 of the cooker side wall and upon further rotation of the rod 180, the plate 80 which carries the dough carton holder and the cutting mechanism, including the cutter lifting rod 125 and the ring nut 140, is elevated above the plate 79, and may be swung (see Figure 9) entirely clear of the rest of the superstructure, and into a position displaced vertically with respect to the cooker, for removing an empty dough container and replacing it with a filled container. The ring nut 140 is thus removed from vertical alignment with the lifter pawl 139. It will be noted that the plate 80 may be lifted sufficiently to cause the deflector 121, which is the lowermost item suspended from the plate 80, to clear the guard rail 71 of the cooker.

When the plate 80 and its supported equipment is swung into the operative position, it is secured in this position against elevation by turning the catch 199 pinned to the plate 79 into the position shown in Figure 9. In this position, the plate 80 is secured against accidental angular movement by a pin 200 on the plate 79 which engages a small socket on the plate 80. The plate 80 is first lowered until this pin and socket engage each other as the two plates contact each other, and the safety catch 198 is then turned into fastening position.

The machine is preferably provided with glass casing sides so that the movement of the operating parts of the machine may be visible to the customer public, passing thereby. The adjustability of the rate of drops per minute is an important feature of the machine. If sales are slow, the machine can be adjusted to drop eight dough portions per minute to prevent piling up of an unsold excess of doughnuts in the receiving container at the end of the cooker channel. The sales attraction afforded by the motion of the parts of the machine is thus still obtained when sales are slow. When business is moderate or good, the number of doughnuts made per minute can be increased. And this adjustment can be made by simply turning the knurled wheel 156, which is placed in an accessible position.

The impeller shaft 26 is driven by a pulley 201 on its upper end which projects above the superstructure plate 79, as shown in Figure 9. The pulley 201 is driven by a belt 202, which is in turn driven by a pulley 203 on the end of the motor shaft, the belt passing around the idler pulleys 204 and 205. The motor shaft upon which the pulley 203 is fixed, travels at the motor speed, which may be about 1750 revolutions per minute as distinguished from the speed of the shaft at the other end of the motor, which by reason of the reduction gearing rotates at a much lower speed, as for instance twenty-four revolutions per minute. It will be noted, however, that the power transmitting means between the motor, and impeller, inverter and conveyer of the cooker on the one hand, and between the motor, and the pump, and cutter operating mechanism on the other hand, insure correlation of the speed of movement of all operating parts, providing for a properly co-ordinated machine. The correlation may not be broken, but may be changed by adjustment of the relief valve 183, by adjustment of the masking wheel 162, and by adjustment of the tube 29. Other adjustments, such as that of the thermostats, the weirs, and the stroke of the cutter will not affect this correlation.

I claim:

1. In a continuously operating, power-driven cooking machine for the production successively of a plurality of similarly shaped and sized cooked products, said machine utilizing as a cooking medium a hot cooking fluid of greater specific gravity than the product, when said products are either partially or wholly cooked but of less specific gravity than the product when wholly uncooked, the combination of: means providing a channel for containing a horizontally surfaced stream of cooking fluid; means for circulating the cooking fluid in an endless stream in said channel; means disposed vertically above the upstream end of the channel for dropping into the stream of cooking fluid in chronological succession a plurality of similarly sized and shaped wholly uncooked portions of dough; and a drop plate positioned directly beneath said dropping means and consisting of a reticulated horizontal plate extending from one side wall of the channel to the other side wall thereof, at a level midway between the surface of the cooking fluid and the bottom surfaces of the channel, and a fluid-tight vertical wall secured to, and extending from, the down stream end of the horizontal plate to the bottom surface of the channel, and from one side wall of the channel to the other side wall thereof, the side walls of the channel being formed with vertical guideways for the reception of the vertical edges of said vertical wall, whereby the drop plate may be removably secured in a fixed position longitudinally and vertically with respect to the channel.

2. In a continuously operating, power-driven cooking machine for the production successively of a plurality of similarly shaped and sized cooked products, said machine utilizing as a cooking medium a hot cooking fluid of greater specific gravity than the product, the combination of: means providing a channel for containing a horizontally surfaced stream of the cooking fluid; said channel presenting in plan contour a spiral terminating at its outer end in a relatively short tangent; means for placing in the stream of cooking fluid adjacent the central inner end of the spiral and in chronological succession a plurality of similarly sized and shaped dough portions which float on the stream of cooking fluid outwardly of the spiral in the course of the cooking operation; a mechanically moving inverting means disposed substantially midway of the distance between the ends of said channel and laterally proximate the tangent for receiving and engaging the dough portions and bodily moving them into an upside down position and releasing them for onward movement with the stream of cooking fluid; said inverting means including a horizontal cross channel rotating first drive shaft extending into the space between the tangent and the inner end portion of the last convolution of the spiral an endless conveyer mounted in the tangent for lifting the cooked products from the stream of cooking fluid and depositing them in a suitable receiver; said conveyor including a horizontal second drive shaft extending into the space between the tangent and inner end portion of the last convolution of the spiral; a vertical power-driven third shaft mounted in said space and extending below the bottom wall of the channel; means providing a conduit for the cooking fluid connecting the tangent end of the channel with the upstream end of the channel at the center of the spiral, the said third shaft extending into the conduit; an impeller at the lower end of the shaft in the conduit; a first helical gear on the third shaft at a level above the impeller; a second helical gear mounted on the second shaft to mesh with said first helical gear for driving the conveyer; and a third helical gear mounted on a horizontal axis in said space to also mesh with the said first helical gear and connected to drive said first drive shaft.

3. In a continuously operating, power-driven cooking machine for the production successively of a plurality of similarly shaped and sized cooked products, said machine utilizing as a cooking medium a hot cooking fluid of greater specific gravity than the product, when said products are either partially or wholly cooked, the combination of: means providing a channel of manifold horizontal contour for containing a horizontally surfaced stream of cooking fluid; means for placing in the stream of cooking fluid at an upstream portion thereof and in chronological succession a plurality of similarly sized and shaped dough portions which are successively and one at a time moved downstream with the cooking fluid; a manifold below the channel connecting the upstream and downstream end thereof to provide an endless route for the circulation of the cooking fluid; a propeller mounted in said connecting manifold for circulating the cooking fluid; a vertically disposed ported outlet pipe rotatably mounted in the upstream end of the channel, said pipe communicating at its lower end through an opening in the bottom wall of the channel with the said connecting manifold; and a stationary vertical wall associated with the channel wall at the upstream end of the channel shaped to cooperate with the port in the pipe for regulating the outward flow of cooking fluid from the pipe to the upstream end of the channel.

4. In a continuously operating, power-driven cooking machine for the production successively of a plurality of similarly shaped and sized cooked products, said machine utilizing as a cooking medium a hot cooking fluid of greater specific gravity than the product, when said products are either partially or wholly cooked, the combination of: means providing a channel for containing a horizontally surfaced stream of cooking fluid; means for placing in the stream of cooking fluid at an upstream portion thereof and in chronological succession a plurality of similarly sized and shaped dough portions of a size such that they form a single file in said channel and which are successively and one at a time propelled downstream by the force of the moving cooking fluid; a hub mounted horizontally across the channel at a station intermediate the ends of the channel; two only doughnut lifting reticulated platforms carried by the hub in diametrically opposite radial planes of said hub; means for intermittently rotating the hub through 180 degree arcs in a direction to move the platforms upwardly on the upstream side of the hub, the platforms during the dwell periods between rotative movements of the hub being momentarily stationary in alternate succession at an upstream, downwardly inclined first position substantially spaced from both the vertical and horizontal, and a second downstream, upwardly inclined position 180 degrees from said first position; a cross channel weir disposed adjacently upstream from the inverting means and spaced from said hub a distance greater than the width of the channel and less than twice the width of the channel, the upper edge of the weir being submerged below the level of the cooking fluid; and a second cross channel weir mounted immediately adjacently below the inverting means at a distance greater than the width of said channel, the upper edge of the weir being submerged below the level of the cooking fluid.

5. In a doughnut machine, the combination of a spiral channel cooking vessel adapted to contain a quantity of cooking oil, means for heating said oil, means for dropping blanks of dough into said oil, a pump and a return conduit connected thereto adapted to maintain a circulation of oil along said channel at a constant volumetric rate with resultant propulsion of said blanks along said channel; said channel in the region of the dropping of said blanks being of less cross-sectional area than at other points along said channel with resultant momentary increase in the linear rate of flow of said oil in said region with the resultant capacity of an increased rate at which blanks may be dropped in said oil.

6. In a doughnut machine, the combination of a spiral channel cooking vessel adapted to contain a quantity of cooking oil, means for heating said oil, means for dropping blanks of dough into said oil, a pump and a return conduit connected thereto adapted to maintain a circulation of oil along said channel at a constant volumetric rate with resultant propulsion of said blanks along said channel; said channel being of uniform width through its length and of less depth at the point at which said blanks are dropped than at other points along its length with resultant increase in the linear rate of flow of the cooking oil at said point and increase in the linear speed with which a dropped blank is moved by said oil out of the vertical path of the next blank to be dropped by said dropping means.

7. In a doughnut machine, the combination of a spiral channel cooking vessel adapted to contain a quantity of cooking oil, means for heating said oil, means for dropping blanks of dough into said oil, a pump and a return conduit connected thereto adapted to maintain a circulation of oil along said channel at a constant volumetric rate with resultant propulsion of said blanks along said channel, blank inverting means disposed in said channel; said channel being so constructed and arranged that the linear rate of flow of the cooking oil therein is momentarily increased at the points at which blanks are dropped and are inverted.

8. In a continuously operating, power-driven cooking machine for the production successively of a plurality of similarly shaped and sized cooked products, said machine utilizing as a cooking medium, a hot cooking fluid of greater specific gravity than the product, when said products are either partially or wholly cooked, the combination of: means providing a channel for containing a horizontally surfaced stream of cooking fluid; means for placing in the stream of cooking fluid at an upstream portion thereof and in chronological succession, a plurality of similarly sized and shaped dough portions which are successively one at a time propelled down the stream by the moving cooking fluid; a hub mounted horizontally across the channel at a station intermediate the ends of the channel; two only doughnut lifting reticulated platforms carried by the hub in diametrically opposite radial planes of said hub; means for intermittently rotating the hub through a 180° arc in a direction to move the platforms upwardly to the upstream side of the hub, the platforms during the dwell periods between rotating movements of the hub, being momentarily stationary in alternate succession at an upstream downwardly inclined first position substantially spaced from both the vertical and horizontal, and a second downstream, downwardly inclined position 180° from said first position, the diameter of the hub and the level of the hub axis with respect to the surface of the cooking fluid being such that a doughnut floating downstream toward the hub will contact and be halted by the hub, the hub being eccentrically mounted on a shaft; and a radially outwardly projecting lug carried by the shaft, and two inwardly projecting lugs carried by the eccentrically mounted hub being disposed to alternatively contact said projecting lug, the eccentricity of the hub being such as to disconnect the shaft lug from one of the hub lugs as one of the platforms is moving downwardly between its vertically upright position and horizontal downstream position, said shaft lug contacting the other lug after it has traveled 180° without contact with either hub lugs.

9. The combination defined in claim 8 in which the shaft lug comprises a spiral spring connected at its inner end to the shaft and formed with an outwardly directed tip at its outer end which overlaps the lugs on the hub when it is in engagement therewith, the spiral curving outwardly in the opposite direction from the direction of rotation of the shaft.

10. In a doughnut machine, the combination of a cooking vessel having an elongated channel, pump means for maintaining a unidirectional flow of cooking oil along said channel at a constant volumetric rate, heating means for said oil, means for forming and dropping blanks of dough into the cooking oil at one end of said channel, means for removing cooked doughnuts from the other end of said channel, and rotatable blank inverting means at the mid-point of said channel adapted to invert the partly cooked blanks; said channel at the discharge side of said inverting means being restricted in cross sectional area with resultant localized increase in the linear rate of flow of said oil at said discharge side.

11. In a doughnut machine, the combination of a cooking vessel having an elongated channel, pump means for maintaining a unidirectional flow of cooking oil along said channel at a constant volumetric rate, heating means for said oil, means for forming and dropping blanks of dough into the cooking oil at one end of said channel, means for removing cooked doughnuts from the other end of said channel, and rotatable blank inverting means at the mid-point of said channel adapted to invert the partly cooked blanks; said channel at the point at which said blanks are dropped and at the discharge side of said inverting means being restricted in cross sectional area with incident localized increases in the linear rate of flow of said cooking oil at said restricted area points.

12. In a doughnut machine, the combination of a cooking vessel having an elongated channel, pump means for maintaining a unidirectional flow of cooking oil along said channel, heating means for said oil, means for forming and dropping blanks of dough into the cooking oil at one end of said channel, means for removing cooked doughnuts from the other end of said channel, and rotatable turning means at the mid-point of said channel adapted to invert the partly cooked blanks; said turning means including a constantly rotating shaft, a two bladed turner having a hub portion surrounding said shaft and rotatable about an axis laterally offset from the axis of said shaft, and clutch means carried by said hub portion and said shaft constructed and arranged to impart a half revolution to said turner for each full revolution of said shaft.

13. In a doughnut machine, the combination of a cooking vessel having an elongated channel, pump means for maintaining a unidirectional flow of cooking oil along said channel, heating means for said oil, means for forming and dropping blanks of dough into the cooking oil at one end of the channel, means for removing cooked doughnuts from the other end of said channel, and rotatable turning means at the mid-point of said channel adapted to invert the partly cooked blanks; said turning means including a constantly rotating driving shaft a two bladed turner having a hub portion surrounding said shaft and rotatable about an axis laterally offset from the axis of said shaft, and clutch means carried by said turner and said shaft comprising a dog element on said shaft and a pair of pin elements carried by said hub portion effective at each revolution of said shaft to rotate the turner through a half revolution only at the same speed as said shaft.

References Cited in the file of this patent

UNITED STATES PATENTS

| | | |
|---|---|---|
| Re. 21,457 | Carpenter | May 21, 1940 |
| 1,440,663 | Dunn | Jan. 2, 1923 |
| 1,516,962 | Gunsolley | Nov. 25, 1924 |
| 1,569,383 | Lindsey | Jan. 12, 1926 |
| 1,605,203 | Baxter | Nov. 2, 1926 |
| 1,605,476 | Smith | Nov. 2, 1926 |
| 1,641,262 | Fontaine et al. | Sept. 6, 1927 |
| 1,665,017 | Bergner | Apr. 3, 1928 |
| 1,834,182 | Roehl | Dec. 1, 1931 |
| 1,904,370 | Hunter | Apr. 18, 1933 |
| 1,938,863 | Ruch | Dec. 12, 1933 |
| 1,992,891 | Schmidt | Feb. 26, 1935 |
| 2,057,639 | Bergner | Oct. 13, 1936 |
| 2,083,082 | Moran | June 8, 1937 |
| 2,088,946 | Carpenter | Aug. 3, 1937 |
| 2,089,158 | Bergner | Aug. 3, 1937 |
| 2,120,302 | Tubbs | June 14, 1938 |
| 2,191,284 | Morris | Feb. 20, 1940 |
| 2,207,561 | Toews | July 9, 1940 |
| 2,207,584 | Gardner | July 9, 1940 |
| 2,208,874 | Toews | July 23, 1940 |
| 2,208,877 | Caswell et al. | July 23, 1940 |
| 2,212,905 | Tota | Aug. 27, 1940 |
| 2,233,485 | Park | Mar. 4, 1941 |
| 2,280,148 | Gardner | Apr. 21, 1942 |

FOREIGN PATENTS

| | | |
|---|---|---|
| 229,433 | Great Britain | Feb. 26, 1925 |